US008913142B2

(12) United States Patent
Kristensson et al.

(10) Patent No.: US 8,913,142 B2
(45) Date of Patent: Dec. 16, 2014

(54) CONTEXT AWARE INPUT SYSTEM FOR FOCUS CONTROL

(75) Inventors: Andreas Kristensson, Lund (SE); Gunnar Klinghult, Lund (SE); Ola Thörn, Limhamn (SE); Pär Stenberg, Lund (SE); Magnus Jendbro, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 213 days.

(21) Appl. No.: 13/449,731

(22) Filed: Apr. 18, 2012

(65) Prior Publication Data

US 2013/0278811 A1 Oct. 24, 2013

(51) Int. Cl.
*H04N 5/232* (2006.01)

(52) U.S. Cl.
USPC .......... 348/211.99; 348/345; 348/207.1; 725/105

(58) Field of Classification Search
None
See application file for complete search history.

(56) References Cited

U.S. PATENT DOCUMENTS

| 2007/0035615 | A1 | 2/2007 | Kung |
| 2008/0036869 | A1* | 2/2008 | Gustafsson et al. ....... 348/222.1 |
| 2008/0278589 | A1 | 11/2008 | Thorn |
| 2013/0194438 | A1* | 8/2013 | Sweet et al. ............... 348/207.1 |

FOREIGN PATENT DOCUMENTS

| EP | 2 104 339 A2 | 9/2009 |
| EP | 2 187 623 A1 | 5/2010 |
| EP | 2 187 625 A1 | 5/2010 |

OTHER PUBLICATIONS

European Patent Office; Extended European Search Report; Sep. 27, 2013; issued in European Patent Application No. EP 13163908.0.

* cited by examiner

*Primary Examiner* — Twyler Haskins
*Assistant Examiner* — Angel L Garces-Rivera
(74) *Attorney, Agent, or Firm* — Sreenivas Vedantam; Moore & Van Allen PLLC

(57) ABSTRACT

The invention is directed to systems, methods and computer program products for controlling a focus operation for an image-capturing device. An exemplary method includes receiving a focus instruction, wherein the focus instruction describes an object of focus; sending first context data to an external system; in response to sending first context data to the external system, receiving second context data from the external system, wherein the second context data comprises data associated with the object of focus; and identifying the object of focus based on the received second context data; and determining a focus distance based on the identified object.

20 Claims, 8 Drawing Sheets

CONTEXT AWARE INPUT SYSTEM FOR FOCUS CONTROL

BACKGROUND

When capturing an image using an image-capturing device, a focus distance for the capturing of the image is determined either manually or using an autofocus function. The focus distance is the distance from the image-capturing device to an object in the scene, where a user of the image-capturing device desires that the object in the scene have a higher degree of sharpness when compared to other objects in the scene. The captured image (or the object of focus in the captured image) may be blurry (or a captured stream of images or video may be shaky) because of the shaking of the image-capturing device at the instant when the image is captured. The shaking may be caused by the movement of the user's fingers or other body parts that are in contact with the image-capturing device at the moment when the image is captured. Additionally, the captured image or the object of focus in the captured image may be blurry because the object may have moved at the instant when the image is captured.

What is needed is a system to reduce or substantially eliminate the blurriness in a captured image or the shakiness in a captured video.

BRIEF SUMMARY

Embodiments of the invention are directed to systems, methods and computer program products for controlling a focus operation for an image-capturing device. In some embodiments, an exemplary method for controlling a focus operation for an image-capturing device comprises receiving a focus instruction, wherein the focus instruction describes an object of focus; sending first context data to an external system; in response to sending first context data to the external system, receiving second context data from the external system, wherein the second context data comprises data associated with the object of focus; identifying the object of focus based on the received second context data; and determining a focus distance based on the identified object.

In some embodiments, the method further comprises capturing an image or a stream of images based on the determined focus distance.

In some embodiments, the sending step comprises determining whether the object of focus can be identified based on the focus instruction and based on data stored in the image-capturing device; and in response to determining the object of focus cannot be identified based on the focus instruction and based on data stored in the image-capturing device, sending the first context data to the external system.

In some embodiments, the identifying step comprises identifying the object of focus based on both the first context data and the second context data.

In some embodiments, the focus instruction is a voice instruction received at a microphone associated with the image-capturing device. In some embodiments, the focus instruction is a text-based instruction.

In some embodiments, the object of focus comprises at least one of a living entity or a non-living entity.

In some embodiments, the first context data comprises data associated with at least one of a location of the image-capturing device, the focus instruction, date, time, weather, intensity of light, one or more image frames to be captured by the image-capturing device, or one or more images previously captured by the image-capturing device.

In some embodiments, the location of the image-capturing device is determined using at least one of a cell site identification system or a global positioning system (GPS).

In some embodiments, the second context data associated with the object of focus comprises at least one of social network data or biometric data.

In some embodiments, the social network data comprises at least one of textual data, photographic data, or video data, and the social network data may be searched based on the local context data.

In some embodiments, the biometric data is at least one of extracted from the social network data or obtained separately from the social network data.

In some embodiments, at least one of the image-capturing device or the external system analyzes at least one of the biometric data or the social network data with respect to the first context data in order to identify an object of focus.

In some embodiments, the method further comprises determining at least one of a location of the image-capturing device or a time of day associated with receiving the focus instruction; determining at least one of whether an object has previously been present in a vicinity of the image-capturing device at or around the same time of day or whether the object has previously been captured by the image-capturing device at or around the same location of the image-capturing device; and in response to determining the object has previously been present in the vicinity of the image-capturing device at or around the same time of day or the object has previously been captured by the image-capturing device at or around the same location of the image-capturing device, determining that the object is the object of focus In some embodiments, the second context data is stored in the image-capturing device.

In some embodiments, the second context data further comprises data regarding other objects in an image-frame.

In some embodiments, the external system comprises an external datastore, and the first context data is a query to search data associated with the external datastore.

In some embodiments, the method further comprises modifying, based at least partially on accessing at least one of the first context data or the second context data, the focus distance when the object of focus moves from a first position to a second position.

In some embodiments, the method further comprises modifying, based at least partially on accessing at least one of the first context data or the second context data, the focus distance based on a facial movement associated with the object of focus.

In some embodiments, the image-capturing device is part of a portable mobile communication device.

In some embodiments, an exemplary image-capturing device is provided. The image-capturing device comprises a memory; a processor; a module, stored in the memory and executable by the processor, configured to receive a focus instruction, wherein the focus instruction describes an object of focus; send first context data to an external system; in response to sending first context data to the external system, receive second context data from the external system, wherein the second context data comprises data associated with the object of focus; identify the object of focus based on the received second context data; and determine a focus distance based on the identified object.

In some embodiments, an exemplary computer program product for controlling a focus operation for an image-capturing device is provided. The computer program product comprises a non-transitory computer readable medium comprising code configured to receive a focus instruction, wherein the focus instruction describes an object of focus; send first context data to an external system; in response to sending first context data to the external system, receive second context data from the external system, wherein the second context data comprises data associated with the object of focus; identify the object of focus based on the received second context data; and determine a focus distance based on the identified object.

BRIEF DESCRIPTION OF THE DRAWINGS

Figure 1:
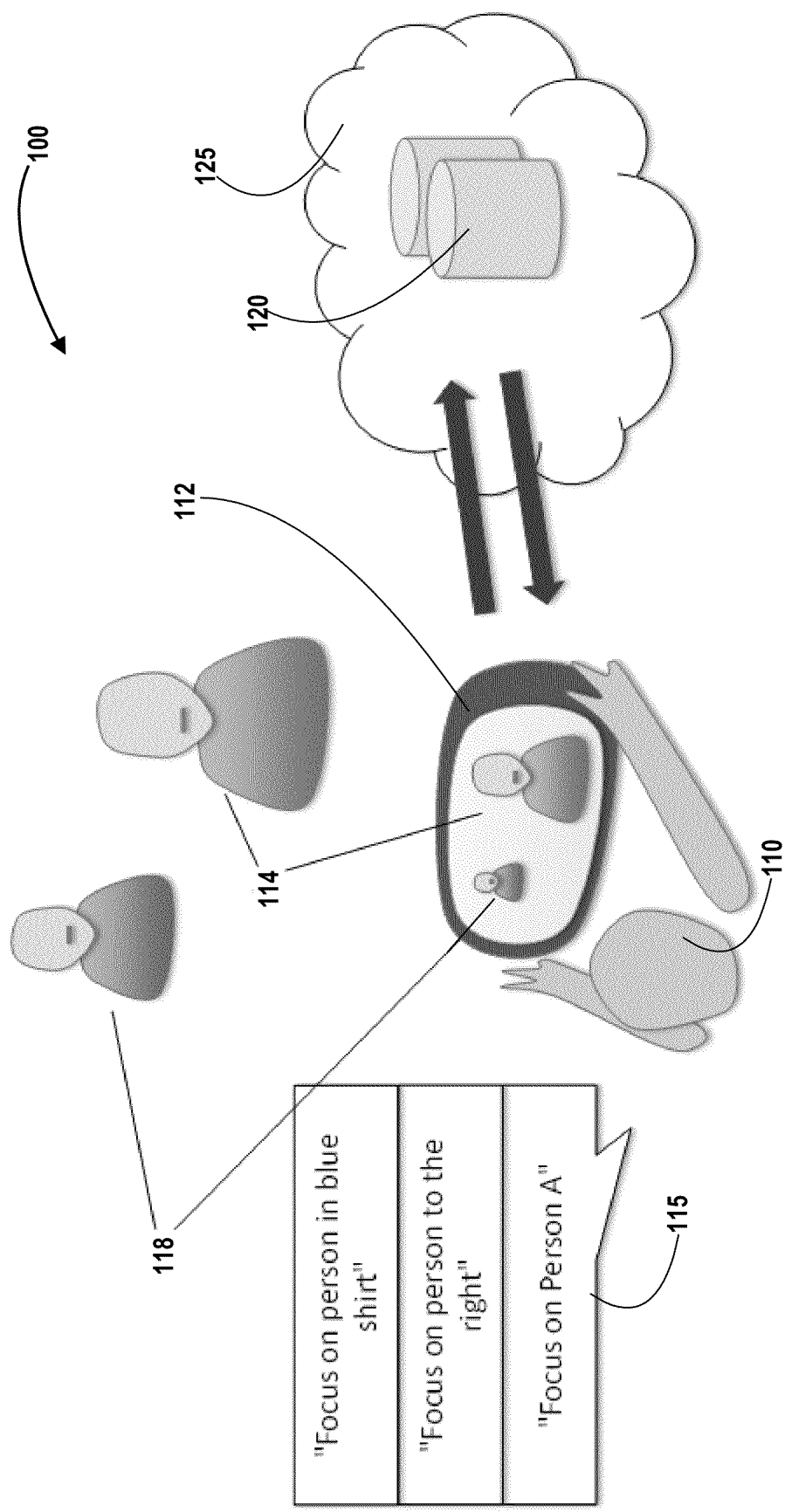
Figure 2:
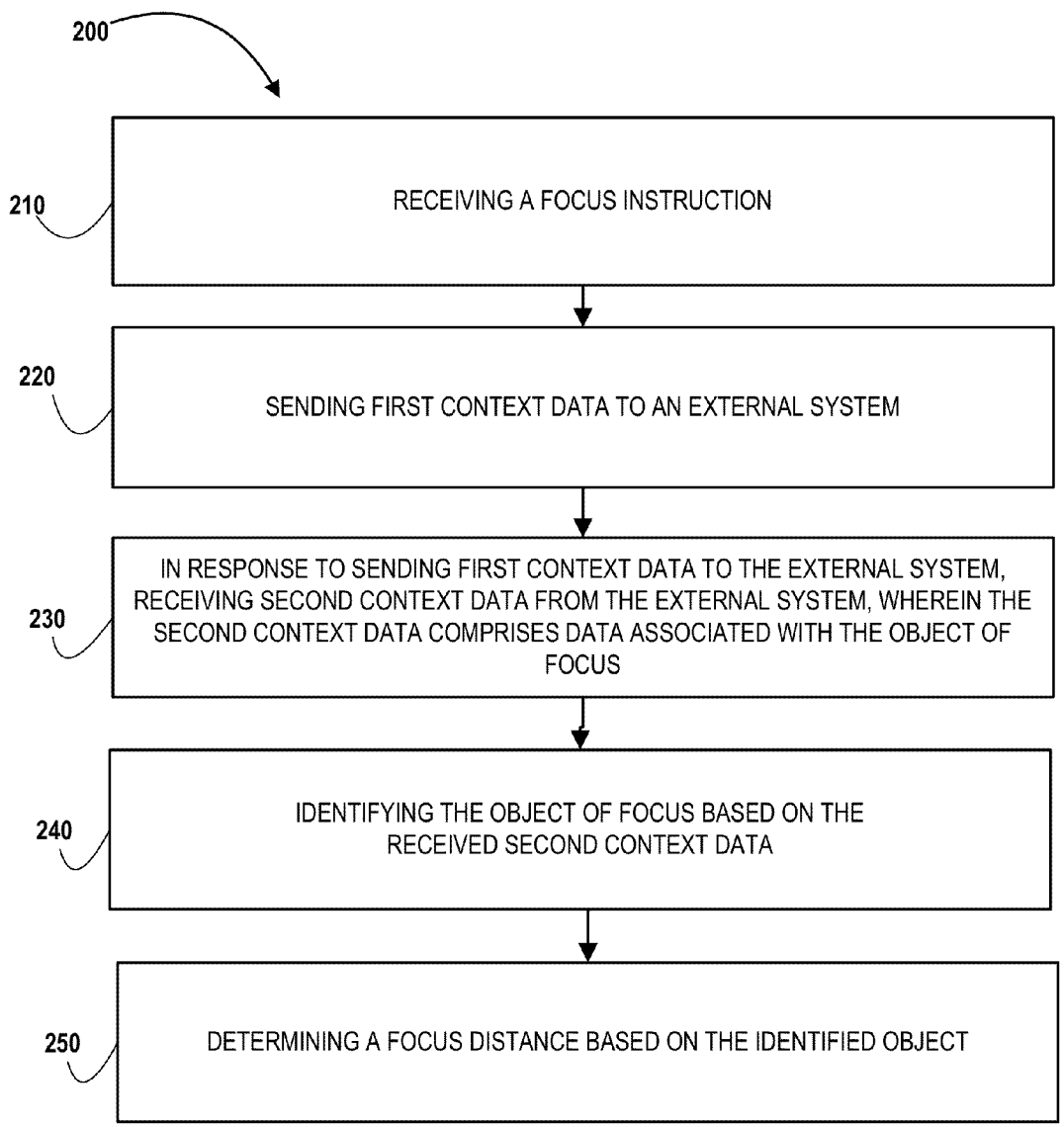
Figure 3:
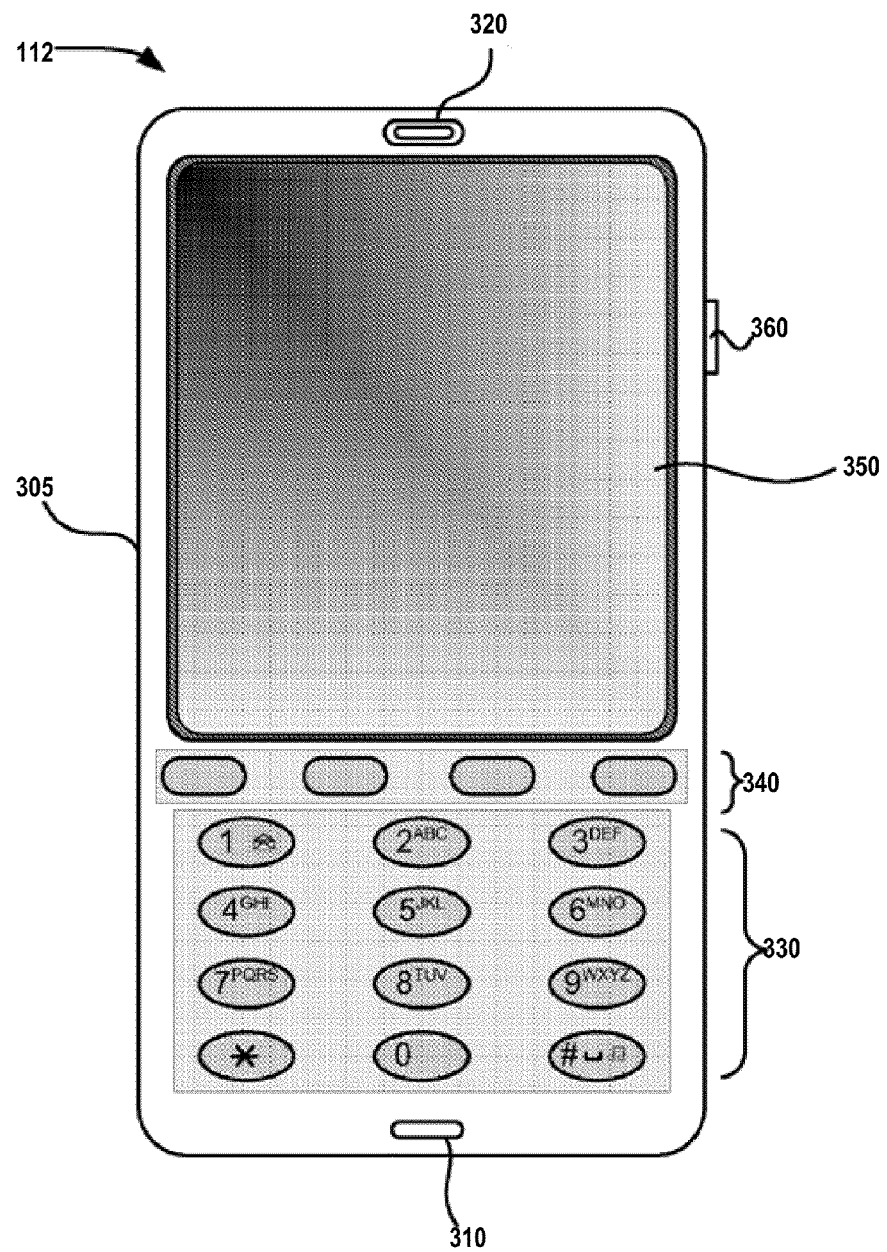
Figure 4:
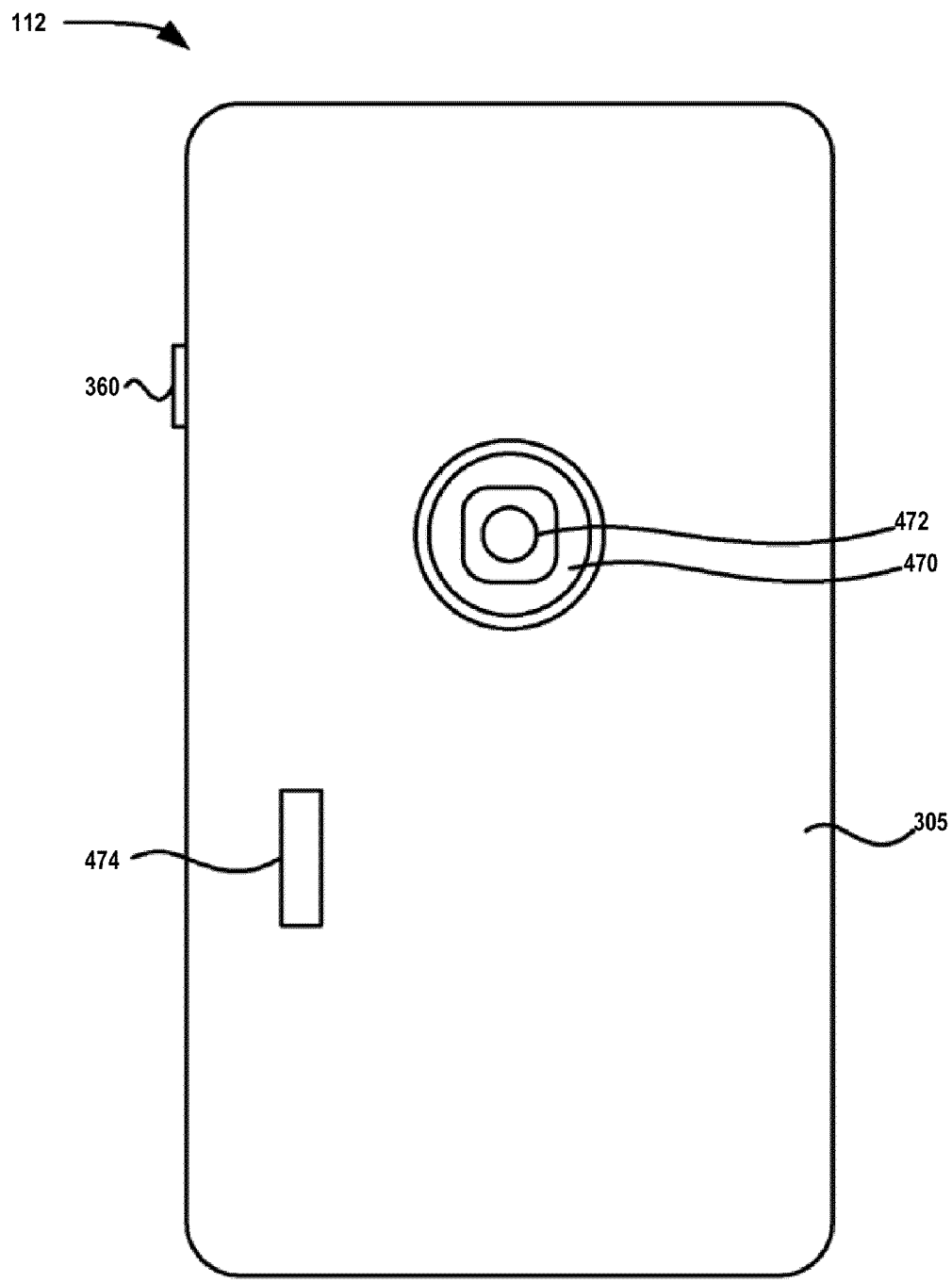
Figure 5:
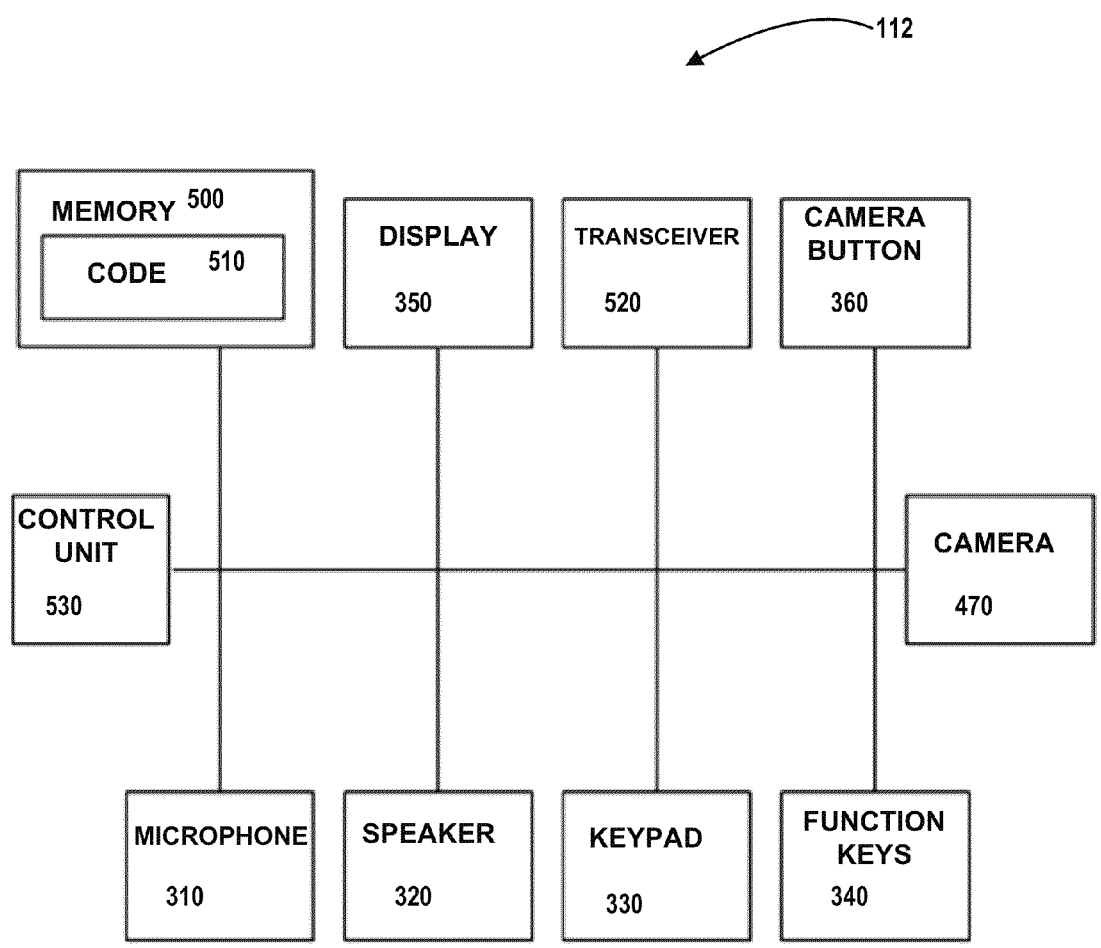
Figure 6:
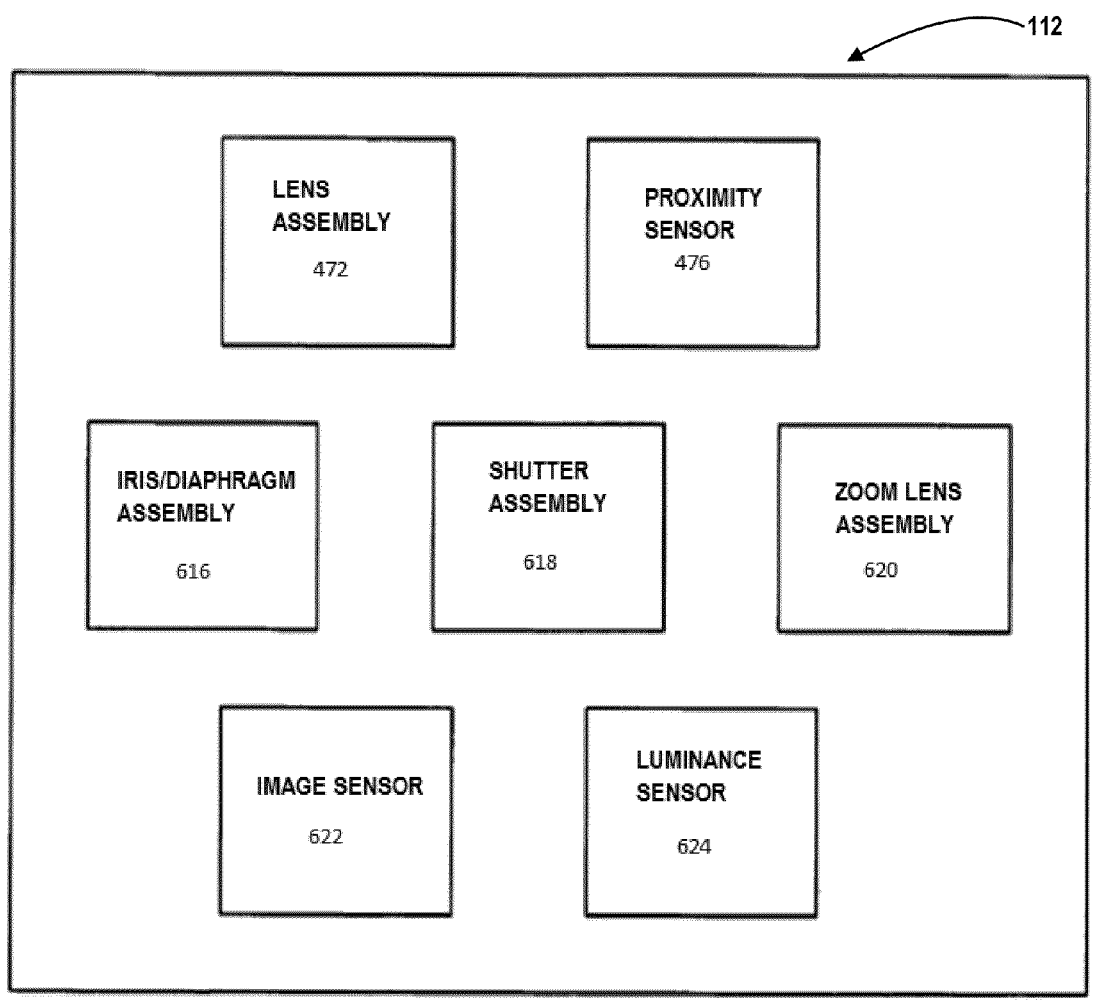
Figure 7:
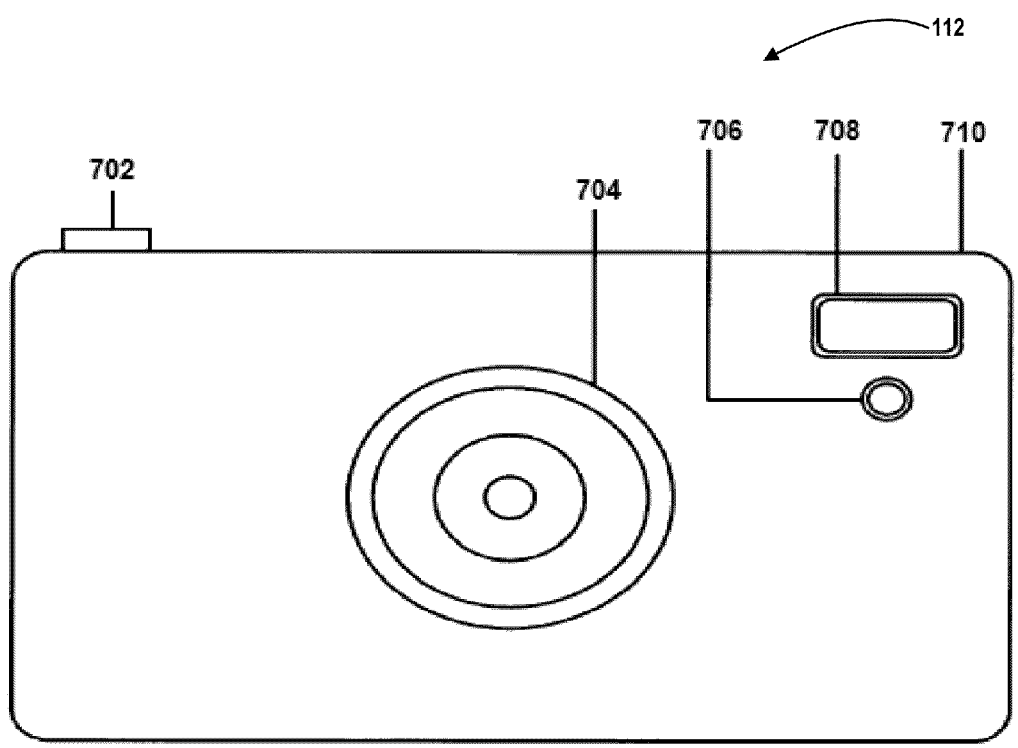
Figure 8:
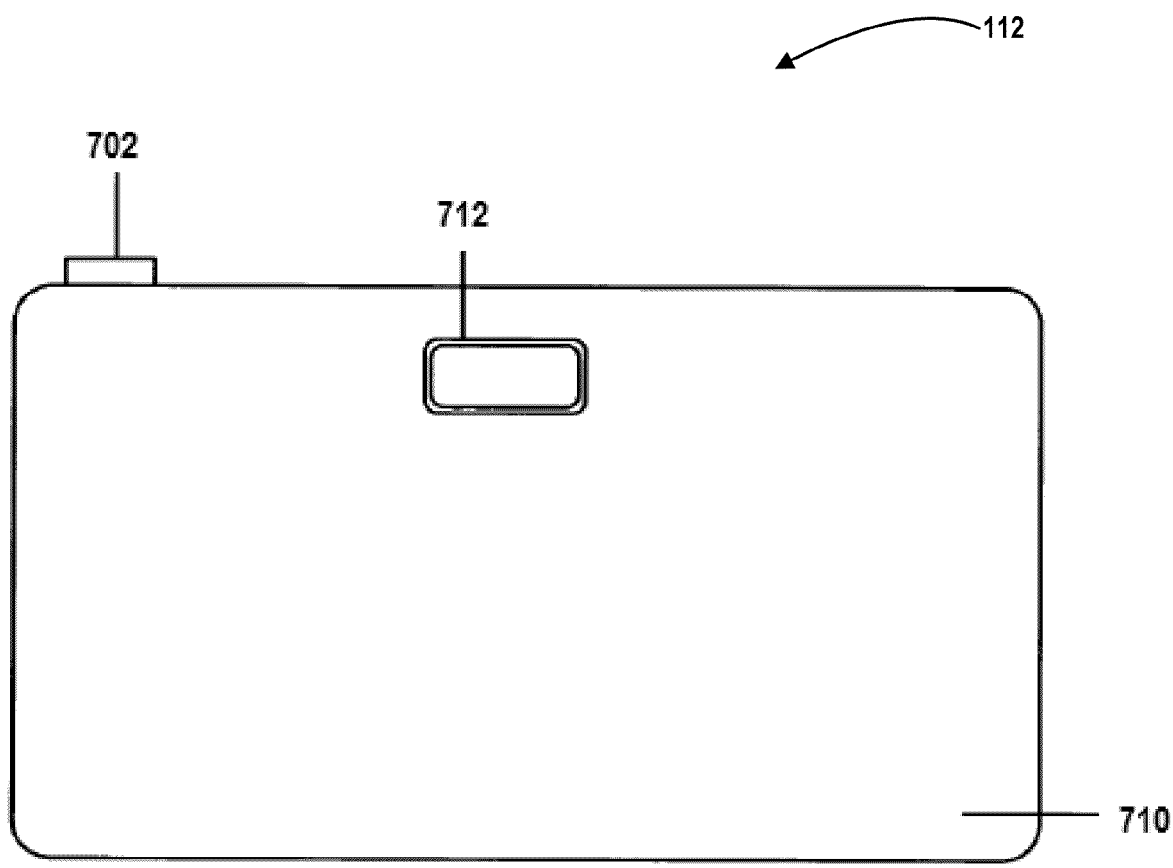

Having thus described embodiments of the invention in general terms, reference will now be made to the accompanying drawings, where:

FIG. 1 is an exemplary system environment for controlling a focus operation for an image-capturing device, in accordance with embodiments of the present invention;

FIG. 2 is an exemplary process flow for controlling a focus operation for an image-capturing device, in accordance with embodiments of the present invention;

FIG. 3 is an exemplary image-capturing device, in accordance with embodiments of the present invention;

FIG. 4 is a diagram illustrating a rear view of exemplary external components of the image-capturing device depicted in FIG. 3, in accordance with embodiments of the present invention; and FIG. 5 is a diagram illustrating exemplary internal components of the image-capturing device depicted in FIG. 3, in accordance with embodiments of the present invention;

FIG. 6 is a diagram illustrating components of an exemplary camera depicted in FIG. 5, in accordance with embodiments of the present invention;

FIG. 7 is another exemplary image-capturing device, in accordance with embodiments of the present invention; and FIG. 8 is a diagram illustrating a rear view of exemplary external components of the image-capturing device depicted in FIG. 7, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

An exemplary method includes receiving a focus instruction at an image-capturing device, wherein the focus instruction describes an object of focus. Additionally, the method includes sending first context data to an external system; in response to sending first context data to the external system, receiving second context data from the external system, wherein the second context data comprises data associated with the object of focus; and identifying the object of focus based on the received second context data; and determining a focus distance based on the identified object.

As used herein, a focus distance is the distance from the image-capturing device (e.g., a lens of the image-capturing device) to an object in a scene to be captured, where a user of the image-capturing device desires that the object in the scene have a higher degree of sharpness when compared to other objects in the scene. This object may be referred to as the 'object of focus' or the 'object in focus.' Therefore, when an image-capturing device captures the scene, a lens positioned in the image-capturing device may cause light to converge upon an image of the object in the captured image frame. When a lens associated with an image-capturing device focuses on an object at a distance, other objects at that distance may also have a similarly high degree of sharpness when captured by the image-capturing device. An object that is not at the same distance (either closer to or further away from the image-capturing device) as the object in focus does have the same degree of sharpness as the object that is in focus.

Referring now to FIG. 1, FIG. 1 presents a system environment 100 for controlling a focus operation for an image-capturing device 112. In some embodiments, the user 110 uses an image-capturing device 112 to capture an image of a first object 114 and a second object 118. In some embodiments, the image-capturing device 112 is a high-speed image-capturing device 112 for quickly interpreting the focus instructions received at the image-capturing device 112 and identifying the object of focus.

In the example environment presented in FIG. 1, the first object 114 is a person on the right side of the image frame who is wearing a blue shirt, and the second object 118 is a person on the left side of the image frame who is wearing a red shirt. In some embodiments, the user inputs instructions 115 (e.g., via the user's voice) into the image-capturing device 112. Exemplary instructions 115 include "Focus on person in blue shirt," "Focus on person to the right," "Focus on Abcd," "Focus on the blue shirt," "Focus on the nose of the person to the right," etc. "Abcd" may be the first name, last name, nick name, or alias associated with one of the persons 114 and 118. Therefore, the focus instruction describes at least one object of focus.

Although the object of focus described in connection with the example environment presented in FIG. 1 is a person, in other examples, the object of focus may comprise another living entity (e.g., a cat, dog, horse, deer, bird, fish, plant, etc.), or a non-living object or feature (e.g., a painting, lake, mountain, beach, etc.).

The image-capturing device 112 receives the instructions 115. In response to receiving the instructions 115, the image-capturing device 112 determines whether the instructions 115 are focus instructions. In response to determining the instructions 115 are focus instructions, the image-capturing device 112 determines whether it understands the instructions 115. In response to determining that the image-capturing device 112 understands the instructions 115, the image-capturing device 112 identifies one or more objects of focus based on the instructions 115. Subsequently, the image-capturing device 112 determines a focus distance based on the one or more identified objects of focus, and captures an image (or video comprising a stream of images) comprising the one or more identified objects of focus.

In response to determining that the image-capturing device 112 does not understand the instructions 115 (i.e., cannot identify the one or more objects of focus), the image-capturing device 112 may access data stored in the image-capturing device 112, and attempt to identify the one or more objects of focus based on the instructions 115 and based on the internal data. If the image-capturing device 112 still cannot identify the one or more objects of focus, the image-capturing device 112 may access an external datastore 120 that is not comprised in the image-capturing device 112. The image-capturing device 112 may access the external datastore 120 via a network and using one or more wired or wireless mechanisms. As used herein, accessing the external datastore 120 may comprise sending data (e.g., data and/or a query) to an external system that has access to the external datastore 120, and receiving data from the external system. The image-capturing device 112 may identify one or more objects of focus based on data received from the external datastore 120. Subsequently, the image-capturing device 112 determines a focus distance based on the one or more identified objects of focus, and captures an image (or video comprising a stream of images) comprising the one or more identified objects of focus. In some embodiments, the external system and/or the external datastore 120 may be referred to as the "cloud" 125.

In some embodiments, the focus instruction is a voice instruction received at a microphone associated with the image-capturing device 112. In other embodiments, the focus instruction is a text-based instruction, wherein the text-based instruction is input using a keypad (or other input system) located separately from the image-capturing device 112, but in communication with the image-capturing device 112. Therefore, in embodiments described herein, a user 110 of the image-capturing device 112 does not use the user's finger or other body part for controlling the focus operation of the image-capturing device 112. This reduces the amount of shaking of the image-capturing device 112 either prior to or at the moment of capturing an image using the image-capturing device 112.

In some embodiments, regardless of whether the image-capturing device 112 understands or does not understand the instructions 115, the image-capturing device 112 transmits data to an external computing system that comprises or has access to an external datastore 120 described herein. The external datastore 120 may comprise one or more distinct datastores. The data transmitted to the external computing system includes local context data (may also be referred to as first context data). As used herein, local context data comprises data associated with at least one of a location of the image-capturing device 112, the focus instruction, calendar, date, time, weather, intensity of light, one or more image frames to be captured by the image-capturing device 112 in the future, or one or more images previously captured by the image-capturing device 112, etc. As used herein, an image frame may refer to a scene that is displayed on the display of the image-capturing device 112. In some embodiments, the weather and/or intensity of light may be associated with the weather and/or intensity of light associated with a predetermined time period immediately prior to sending the local context data to the external system.

The location of the image-capturing device 112 may be determined by the image-capturing device 112 using at least one of a cell site identification system or a global positioning system (GPS). In embodiments where the image-capturing device 112 uses a GPS, the image-capturing device 112 comprises a GPS transceiver that sends data to and/or receives data from a GPS satellite. The image-capturing device 112 receives GPS coordinates from a GPS satellite and uses these coordinates to determine the location of the image-capturing device 112. In embodiments where the image-capturing device 112 uses a cell site identification system, the image-capturing device 112 comprises at least one antenna, receiver, and transmitter. The image-capturing device 112 uses at least one of the antenna, receiver, or transmitter to identify a cell site (e.g., a base station) located near to or nearest to the image-capturing device 112. In some embodiments, the image-capturing device 112 uses the location of the cell site as the location of the image-capturing device 112. In other embodiments, the image-capturing device 112 may determine the location of the image-capturing device 112 based on the determined location of the cell site. The method of determining the location of the image-capturing device 112 is not limited to the methods described herein.

In some embodiments, the local context data is framed as a query and sent from the image-capturing device 112 to the external system. The external system may execute a search operation (e.g., on the external datastore 120) based on the query. The search results may be transmitted back from the external system to the image-capturing device 112. In some embodiments, the search results comprise the second context data described herein. The search results obtained from executing the query may be analyzed (e.g., with respect to the local context data) by either the external system or the image-capturing device 112 in order to identify the object of focus.

In some embodiments, in response to sending the local context data to the external system, the image-capturing device 112 receives second context data from the external system. The second context data may include social network data or biometric data. In some embodiments, the social network data includes at least one of text data, photographs, or other media (audio, video, etc.). In some embodiments, other network data may be obtained as well (e.g., from discussion forums, websites, gaming networks, multimedia networks, etc.). As used herein, social network data may additionally or alternatively refer to data associated with these various other networks. In some embodiments, the various network data described herein includes data that assists at least one of the external system or the image-capturing device 112 in identifying the object of focus and/or in predicting one or more actions or motions associated with the object of focus.

Therefore, the image-capturing device 112 has a "context-aware" input system because the focus instructions 115 received at the image-capturing device 112 from the user 110 are analyzed with respect to at least one of the local context data or the received second context data to determine the context associated with the objects (including the object of focus) in the image frame. As used herein, the word "context" may refer to any portion of the local context data or the second context data. The determined context may be used by the image-capturing device 112 to identify the various objects (including the object of focus) displayed on the image frame.

In some embodiments, the local context data may also include the name of the user 110 of the image-capturing device 112, names of previously identified objects associated with previously received focus instructions, or names identified in the current focus instruction. Additionally, in some embodiments, the local context data also includes the names of contacts associated with the user 110 or a previously identified object from one or more social networks. These names may be useful in searching one or more social networks as described below.

In some embodiments, the various networks may be searched using one or more search criteria. For example, if the external system or the image-capturing device 112 determines that the focus instruction comprises a name, the networks may be searched using the name as a parameter. Additionally or alternatively, in other embodiments, the name of the user 110 of the image-capturing device 112 (stored on the image-capturing device 112) may be used as a search parameter. Additionally or alternatively, in other embodiments, a name of a previously identified object of focus (stored on the image-capturing device 112) may be used as the search parameter. Additionally or alternatively, in other embodiments, the user's social network account may be accessed by at least one of the image-capturing device 112 or the external system, and a name of the user's contact or connection on the social network may be used as the search parameter.

As used herein, biometric data refers to physical, physiological or behavioral traits associated with a person. A biometric may be used by the image-capturing device 112 or the external system to identify an object in an image frame based on the object's voice, gait, DNA, finger print or hand print, hand geometry, behavior, height, gender, hair color, eye color, handwriting, facial features (e.g., iris, retina, nose structure, ear structure, etc.), etc. As used herein, an object's gait may refer to the object's body mechanics, body movement, muscle activity, etc. In some embodiments, biometric data may be extracted by at least one of the external system or the image-capturing device 112 from the social network data or may be obtained separately from other sources (e.g., from non-social network sources). This biometric data may be analyzed with respect to the local context data (by at least one of the image-capturing device 112 or the external system) to identify an object of focus (or other objects in the image frame).

In some embodiments, at least one of the image-capturing device 112 or the external system analyzes at least one of the biometric data or the social network data with respect to the first context data in order to identify the object of focus. In some embodiments, the second context data comprises data (e.g., social network data, biometric data, etc.) regarding just the object of focus, while in other embodiments, the second context data additionally comprises data (e.g., social network data, biometric data, etc.) regarding other objects in the image frame.

In some embodiments, the received second context data is stored in the image-capturing device 112. The received second context data may be stored so that for future focus instructions, the image-capturing device 112 can analyze the future focus instructions based on the stored data (and/or based on the local context data generated immediately prior to capturing the image). If the image-capturing device 112 cannot identify the object of focus based on the stored data (and/or based on the local context data), then the image-capturing device 112 sends local context data to the external system.

In some embodiments, at least one of the local context data or the second context data assists in the image-capturing device 112 in following (or in predicting) a movement of an object of focus (or of any other object in the image frame) from a first position to a second position. In other embodiments, at least one of the local context data or the second context data assists in the image-capturing device 112 in following (or in predicting) a facial movement of an object of focus (or of any other object in the image frame). A facial movement may refer to any particular facial feature or part, or movement of a facial feature or part. For example, every person has a different smile, and every person's smile causes different lines or wrinkles to appear on a person's face. The image-capturing device 112 uses at least one of the local context data or the second context data to adjust the focusing operation based on these lines that appear on the person's face. In some embodiments, the image-capturing device 112 may adjust the focusing operation at the moment when the smile appears (e.g., in a 'following' mode), or prior to when the smile appears (e.g., in a 'predictive' mode).

In some embodiments, the context-aware input system described herein works in bad lighting conditions (e.g., when the light intensity level is equal to or less than a predetermined threshold light intensity level). Therefore, the image-capturing device 112 may have a light sensor that measures the ambient light intensity and determines that the ambient light intensity level is equal to or less than a predetermined threshold light intensity level. This determination may be included in the local context data. By including this determination in the local context data, the image-capturing device 112 or the external system will use the information to determine that physical features (e.g., facial features such as eyes, nose, ears, etc.) associated with the objects in the image frame may be unavailable or unreliable because of the lack of light in the image frame. Therefore, the image-capturing device 112 or the external system may identify the object based on other biometric data associated with the object (e.g., the object's voice) or other context data (e.g., the object is normally present at the location of the image capture and/or on the day or time of the image capture).

In some embodiments, the voice input instructions 115 may be communicated to the image-capturing device 112 even when the user 110 is far away from the image-capturing device 112. For example, the user 110 may be wearing a microphone system (e.g., a stand-alone microphone device, a headset comprising a microphone, etc.) that receives the voice instructions 115 from the user 110 and transmits the instructions 115 wirelessly to the image-capturing device 112. This microphone system may even be used to communicate the voice instructions 115 to the image-capturing device 112 in a noisy environment.

In some embodiments, the image-capturing device 112 (when powered on) constantly identifies objects in the environment or vicinity of (e.g., within a predetermined distance from the image-capturing device 112) where the image-capturing device 112 is located. The image-capturing device 112 may maintain or store in a database the identified objects and the date or time associated with the identification. This database may be stored either in the image-capturing or at an external location (e.g., the external system). This database may be accessed by the image-capturing device 112 when it receives a focus instruction in the future. The image-capturing device 112 may identify an object of focus (or an object in the image frame) by accessing the database and identifying the object by determining that the time of day of the image capture substantially corresponds with the time of day when the identified object was previously present in the location of the image capture. In other embodiments, the image-capturing device 112 (or the external system) may identify an object of focus (or an object in the image frame) by determining that a photograph of an object received from a social network (or stored on the image-capturing device 112) was captured at a substantially similar time of day as when the current focus instruction was received or was captured in the current location of the image-capturing device 112. This determination may be used by the image-capturing device 112 or the external system to determine that an object in the photograph is the same as the object in the image frame to be captured based on the focus instruction received from the user 110.

An example of the invention is now described. For example, the image-capturing device 112 receives a voice instruction "Focus on Abcd." If the image-capturing device 112 cannot identify "Abcd" based on the voice instruction and/or based on local context data generated by the image-capturing device 112, this voice instruction may be sent along with the local context data to the external system. The external system may use the local context data (including the voice instruction) to search one or more networks (e.g., a social network). The external system may process the social network data at the external system or may send the social network data to the image-capturing device 112.

Subsequently, at least one of the external system or the image-capturing device 112 may extract biometric data from the social network data (e.g., a photograph associated with the user's social network account or "Abcd's" social network account). The biometric data associated with objects in the photograph may be compared to biometric data associated with the image frame to be captured. Therefore, in some embodiments, at least one of the image-capturing device 112 or the external system extracts biometric data from the local context data (e.g., from one or more image frames to be captured).

This comparison may be combined with timing or calendar data that indicates that a particular object is normally present in the vicinity of the image-capturing device 112 at the time of the day when the focus instruction was received. This processing of the biometric data and the timing or calendar information results in a determination that the particular object is "Abcd." The image-capturing device 112 subsequently determines a focusing distance based on the identified object of focus (i.e., "Abcd").

In some embodiments, at least one of the image-capturing device 112 or the external system may be unable to interpret the focus instructions 115 and identify the object of focus. In such embodiments, the image-capturing device 112 may present an indication (e.g., a message on the image-capturing device 112 display) that the image-capturing device 112 cannot understand the focus instructions 115 and/or that the image-capturing device 112 cannot identify the object of focus. In some embodiments, at least one of the image-capturing device 112 or the external system attaches a statistical confidence number to an identification of an object of focus. In such embodiments, the image-capturing device 112 or the external system positively identifies the object of focus when the statistical confidence number is greater than or equal to a threshold number. When the statistical confidence number is less than the predetermined threshold, the image-capturing device 112 may present an indication (e.g., a message on the image-capturing device 112 display) that the image-capturing device 112 cannot understand the focus instructions 115 and/or that the image-capturing device 112 cannot identify the object of focus.

Referring now to FIG. 2, FIG. 2 presents a process flow 200 for controlling a focus operation for an image-capturing device. The various process blocks presented in FIG. 2 may be executed in an order that is different from that presented in FIG. 2. Additionally, in other embodiments, the process flow may comprise more or fewer process blocks compared to those presented in FIG. 2. At block 210, the process flow comprises receiving a focus instruction, wherein the focus instruction describes an object of focus. At block 220, the process flow comprises sending first context data to an external system. At block 230, the process flow comprises in response to sending first context data to the external system, receiving second context data from the external system, wherein the second context data comprises data associated with the object of focus. At block 240, the process flow comprises identifying the object of focus based on the received second context data. At block 250, the process flow comprises determining a focus distance based on the identified object.

Referring now to FIG. 3, FIG. 3 is a diagram illustrating a front view of external components of an exemplary image-capturing device. As illustrated in FIG. 3, image-capturing device 112 may include a housing 305, a microphone 310, a speaker 320, a keypad 330, function keys 340, a display 350, and a camera button 360. As illustrated in FIG. 3, the image-capturing device may be part of a portable mobile communication device.

Housing 305 may include a structure configured to contain or at least partially contain components of image-capturing device 112. For example, housing 305 may be formed from plastic, metal or other natural or synthetic materials or combination(s) of materials and may be configured to support microphone 310, speaker 320, keypad 330, function keys 340, display 350, and camera button 360.

Microphone 310 may include any component capable of transducing air pressure waves to a corresponding electrical signal. For example, a user may speak into microphone 310 during a telephone call. Microphone 310 may be used to receive audio from the user or from the environment surrounding the device 112. Speaker 320 may include any component capable of transducing an electrical signal to a corresponding sound wave. For example, a user may listen to music through speaker 320.

Keypad 330 may include any component capable of providing input to device 112. Keypad 330 may include a standard telephone keypad. Keypad 330 may also include one or more special purpose keys. In one implementation, each key of keypad 330 may be, for example, a pushbutton. Keypad 330 may also include a touch screen. A user may utilize keypad 330 for entering information, such as text or a phone number, or activating a special function. In embodiments where the display 350 is a touch screen display, the keypad 330 may include virtual keys that are incorporated into a touch screen display 350.

Function keys 340 may include any component capable of providing input to image-capturing device 112. Function keys 340 may include a key that permits a user to cause image-capturing device 112 to perform one or more operations. The functionality associated with a key of function keys 340 may change depending on the mode of image-capturing device 112. For example, function keys 340 may perform a variety of operations, such as placing a telephone call, receiving focus instructions, playing various media, setting various camera features (e.g., focus, zoom, etc.) or accessing an application. Function keys 340 may include a key that provides a cursor function and a select function. In one implementation, each key of function keys 340 may be, for example, a pushbutton. In some embodiments, the function keys 340 are virtual keys that are incorporated into a touch screen display 350.

Display 350 may include any component capable of providing visual information. For example, in one implementation, display 350 may be a liquid crystal display (LCD). In another implementation, display 350 may be any one of other display technologies, such as a plasma display panel (PDP), a field emission display (FED), a thin film transistor (TFT) display, etc. Display 350 may be utilized to display, for example, text, image, and/or video information. Display 350 may also operate as a view finder, as will be described later. Camera button 360 may be a pushbutton that enables a user to take an image.

Since image-capturing device 112 illustrated in FIG. 3 is exemplary in nature, image-capturing device 112 is intended to be broadly interpreted to include any type of electronic device that includes an image-capturing component. For example, image-capturing device 112 may include a wireless phone, a personal digital assistant (PDA), a portable computer, a camera, or a wrist watch. In other instances, image-capturing device 112 may include, for example, security devices or military devices. Accordingly, although FIG. 3 illustrates exemplary external components of image-capturing device 112, in other implementations, image-capturing device 112 may contain fewer, different, or additional external components than the external components depicted in FIG. 3. Additionally, or alternatively, one or more external components of image-capturing device 112 may include the capabilities of one or more other external components of image-capturing device 112. For example, display 350 may be an input component (e.g., a touch screen). Additionally, or alternatively, the external components may be arranged differently than the external components depicted in FIG. 3.

Referring now to FIG. 4, FIG. 4 is a diagram illustrating a rear view of external components of the exemplary image-capturing device. As illustrated, in addition to the components previously described, image-capturing device 112 may include a camera 470, a lens assembly 472, a proximity sensor 476, and a flash 474.

Camera 470 may include any component capable of capturing an image or a stream of images (video). Camera 470 may be a digital camera or a digital video camera. Display 350 may operate as a view finder when a user of image-capturing device 112 operates camera 470. Camera 470 may provide for automatic and/or manual adjustment of a camera setting. In one implementation, image-capturing device 112 may include camera software that is displayable on display 350 to allow a user to adjust a camera setting. For example, a user may be able adjust a camera setting by operating function keys 340.

Lens assembly 472 may include any component capable of manipulating light so that an image may be captured. Lens assembly 472 may include a number of optical lens elements. The optical lens elements may be of different shapes (e.g., convex, biconvex, plano-convex, concave, etc.) and different distances of separation. An optical lens element may be made from glass, plastic (e.g., acrylic), or plexiglass. The optical lens may be multicoated (e.g., an antireflection coating or an ultraviolet (UV) coating) to minimize unwanted effects, such as lens flare and inaccurate color. In one implementation, lens assembly 472 may be permanently fixed to camera 470. In other implementations, lens assembly 472 may be interchangeable with other lenses having different optical characteristics. Lens assembly 472 may provide for a variable aperture size (e.g., adjustable f-number).

Proximity sensor 476 may include any component capable of collecting and providing distance information that may be used to enable camera 470 to capture an image properly. For example, proximity sensor 476 may include an infrared (IR) proximity sensor that allows camera 470 to compute the distance to an object, such as a human face, based on, for example, reflected IR strength, modulated IR, or triangulation. In another implementation, proximity sensor 476 may include an acoustic proximity sensor. The acoustic proximity sensor may include a timing circuit to measure echo return of ultrasonic soundwaves. In embodiments that include a proximity sensor 476, the proximity sensor may be used to determine a distance to one or more moving or non-moving objects, which may or may not be in focus, at least one of prior to, during, or after capturing of an image frame of a scene.

Flash 474 may include any type of light-emitting component to provide illumination when camera 470 captures an image. For example, flash 474 may be a light-emitting diode (LED) flash (e.g., white LED) or a xenon flash. In another implementation, flash 474 may include a flash module.

Although FIG. 4 illustrates exemplary external components, in other implementations, image-capturing device 112 may include fewer, additional, and/or different components than the exemplary external components depicted in FIG. 4. For example, in other implementations, camera 470 may be a film camera. Additionally, or alternatively, depending on image-capturing device 112, flash 474 may be a portable flashgun. Additionally, or alternatively, image-capturing device 112 may be a single-lens reflex camera. In still other implementations, one or more external components of image-capturing device 112 may be arranged differently.

Referring now to FIG. 5, FIG. 5 is a diagram illustrating internal components of the exemplary image-capturing device. As illustrated, image-capturing device 112 may include microphone 310, speaker 320, keypad 330, function keys 340, display 350, camera button 360, camera 470, a memory 500, a transceiver 520, and a control unit 530.

Memory 500 may include any type of storing component to store data and instructions related to the operation and use of image-capturing device 112. For example, memory 500 may include a memory component, such as a random access memory (RAM), a read only memory (ROM), and/or a programmable read only memory (PROM). Additionally, memory 500 may include a storage component, such as a magnetic storage component (e.g., a hard drive) or other type of computer-readable or computer-executable medium. Memory 500 may also include an external storing component, such as a Universal Serial Bus (USB) memory stick, a digital camera memory card, and/or a Subscriber Identity Module (SIM) card.

Memory 500 may include a code component 510 that includes computer-readable or computer-executable instructions to perform one or more functions. These functions include initiating and/or executing the processes illustrated in FIG. 2. However, the functions are not limited to those illustrated in FIG. 2. The code component 510 may work in conjunction with one or more other hardware or software components associated with the image-capturing device 112 to initiate and/or execute the processes illustrated in FIG. 2 or other processes described herein. Additionally, code component 510 may include computer-readable or computer-executable instructions to provide other functionality other than as described herein.

Transceiver 520 may include any component capable of transmitting and receiving information wirelessly or via a wired connection. For example, transceiver 520 may include a radio circuit that provides wireless communication with a network or another device.

Control unit 530 may include any logic that may interpret and execute instructions, and may control the overall operation of image-capturing device 112. Logic, as used herein, may include hardware, software, and/or a combination of hardware and software. Control unit 530 may include, for example, a general-purpose processor, a microprocessor, a data processor, a co-processor, and/or a network processor. Control unit 530 may access instructions from memory 500, from other components of image-capturing device 112, and/or from a source external to image-capturing device 112 (e.g., a network or another device).

Control unit 530 may provide for different operational modes associated with image-capturing device 112. Additionally, control unit 530 may operate in multiple modes simultaneously. For example, control unit 530 may operate in a camera mode, a walkman mode, and/or a telephone mode. For example, when in camera mode, face-detection and tracking logic may enable image-capturing device 112 to detect and track multiple objects (e.g., the presence and position of each object's face) within an image to be captured.

Although FIG. 5 illustrates exemplary internal components, in other implementations, image-capturing device 112 may include fewer, additional, and/or different components than the exemplary internal components depicted in FIG. 5. For example, in one implementation, image-capturing device 112 may not include transceiver 520. In still other implementations, one or more internal components of image-capturing device 112 may include the capabilities of one or more other components of image-capturing device 112. For example, transceiver 520 and/or control unit 530 may include their own on-board memory.

Referring now to FIG. 6, FIG. 6 is a diagram illustrating components of the exemplary camera depicted in FIG. 5. FIG. 6 illustrates lens assembly 472, proximity sensor 476, an iris/diaphragm assembly 616, a shutter assembly 618, a zoom lens assembly 620, an image sensor 622, and a luminance sensor 624.

Iris/diaphragm assembly 616 may include any component providing an aperture. Iris/diaphragm assembly 616 may be a thin, opaque, plastic structure with one or more apertures. This iris/diaphragm assembly 616 may reside in a light path of lens assembly 472. Iris/diaphragm assembly 616 may include different size apertures. In such instances, iris/diaphragm assembly 616 may be adjusted, either manually or automatically, to provide a different size aperture. In other implementations, iris/diaphragm assembly 616 may provide only a single size aperture.

Shutter assembly 618 may include any component for regulating a period of time for light to pass through iris/diaphragm assembly 616. Shutter assembly 618 may include one or more shutters (e.g., a leaf or a blade). The leaf or blade may be made of, for example, a metal or a plastic. In one implementation, multiple leaves or blades may rotate about pins so as to overlap and form a circular pattern. In one implementation, shutter assembly 618 may reside within lens assembly 472 (e.g., a central shutter). In other implementations, shutter assembly 618 may reside in close proximity to image sensor 622 (e.g., a focal plane shutter). Shutter assembly 618 may include a timing mechanism to control a shutter speed. The shutter speed may be manually or automatically adjusted.

Zoom lens assembly 620 may include lens elements to provide magnification and focus of an image based on the relative position of the lens elements. Zoom lens assembly 620 may include fixed and/or movable lens elements. In one implementation, a movement of lens elements of zoom lens assembly 620 may be controlled by a servo mechanism that operates in cooperation with control unit 530.

Image sensor 622 may include any component to capture light. For example, image sensor 622 may be a charge-coupled device (CCD) sensor (e.g., a linear CCD image sensor, an interline CCD image sensor, a full-frame CCD image sensor, or a frame transfer CCD image sensor) or a Complementary Metal Oxide Semiconductor (CMOS) sensor. Image sensor 622 may include a grid of photo-sites corresponding to pixels to record light. A color filter array (CFA) (e.g., a Bayer color filter array) may be on image sensor 622. In other implementations, image sensor 622 may not include a color filter array. The size of image sensor 622 and the number and size of each pixel may vary depending on image-capturing device 112. Image sensor 622 and/or control unit 530 may perform various image processing, such as color aliasing and filtering, edge detection, noise reduction, analog to digital conversion, interpolation, compression, white point correction, etc.

Luminance sensor 624 may include any component to sense the intensity of light (i.e., luminance). Luminance sensor 624 may provide luminance information to control unit 530 so as to determine whether to activate flash 474. For example, luminance sensor 624 may include an optical sensor integrated circuit (IC).

Although FIG. 6 illustrates exemplary components, in other implementations, image-capturing device 112 may include fewer, additional, and/or different components than the exemplary components depicted in FIG. 6. For example, when image-capturing device 112 is a film camera, image sensor 622 may be film. Additionally, it is to be understood that variations may exist among different devices as to the arrangement, placement, number, adjustability, shape, material, etc., relating to the exemplary components described above. In still other implementations, one or more exemplary components of image-capturing device 112 may include the capabilities of one or more other components of image-capturing device 112. For example, lens assembly 472 may include zoom lens assembly 620.

Referring now to FIGS. 7 and 8, FIGS. 7 and 8 are diagrams illustrating a front and rear view of external components of another exemplary image-capturing device. In this implementation, image-capturing device 112 may take the form of a camera, with or without additional communication functionality, such as the ability to make or receive telephone calls or connect to a data network. As illustrated, image-capturing device 112 may include a camera button 702, a lens assembly 704, a proximity sensor 706, a flash 708, a housing 710, and a viewfinder 712. Camera button 702, lens assembly 704, proximity sensor 706, flash 708, housing 710 and viewfinder 712 may include components that are similar to camera button 360, lens assembly 472, proximity sensor 476, flash 474, housing 305 and display 350 of image-capturing device 112, and may operate similarly. Although not illustrated, image-capturing device 112 may also include components that have been described with reference to FIGS. 5 and 6.

Examples of wireless mechanisms for various wireless communication communications described herein include near-field communication (NFC), infra-red transmission (IR), Bluetooth, short-range radio frequency (RF) signals, IEEE 802.11x, WiFi, wireless universal serial bus (USB), HomeRF, IrDA-based (Infrared Data Association) transmission, etc. The invention is not limited to any wired or wireless mechanisms described herein.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

As used herein, the term "automatic" refers to a function, a process, a method, or any part thereof, which is executed by computer software upon occurrence of an event or a condition without intervention by a user.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for controlling a focus operation for an image-capturing device, the method comprising:
   receiving, using a computing device processor, a focus instruction, wherein the focus instruction describes an object of focus;
   sending, using a computing device processor, first context data to an external system, wherein the first context data comprises a location of the image-capturing device;
   in response to sending first context data to the external system, receiving, using a computing device processor, second context data from the external system, wherein the second context data comprises social network data associated with the object of focus;
   identifying, using a computing device processor, the object of focus based on the received second context data; and
   determining, using a computing device processor, a focus distance based on the identified object.

2. The method of claim 1, further comprising capturing an image or a stream of images based on the determined focus distance.

3. The method of claim 1, wherein the sending step comprises:

determining whether the object of focus can be identified based on the focus instruction and based on data stored in the image-capturing device; and in response to determining the object of focus cannot be identified based on the focus instruction and based on data stored in the image-capturing device, sending the first context data to the external system.

4. The method of claim 1, wherein the identifying step comprises identifying the object of focus based on both the first context data and the second context data.

5. The method of claim 1, wherein the focus instruction comprises at least one of a voice instruction received at a microphone associated with the image-capturing device or a text-based instruction received at the image-capturing device.

6. The method of claim 1, wherein the object of focus comprises at least one of a living entity or a non-living entity.

7. The method of claim 1, wherein the first context data comprises data associated with at least one of: the focus instruction, date, time, weather, intensity of light, one or more image frames to be captured by the image-capturing device, or one or more images previously captured by the image-capturing device.

8. The method of claim 7, wherein the location of the image-capturing device is determined using at least one of a cell site identification system or a global positioning system (GPS).

9. The method of claim 1, wherein the second context data associated with the object of focus comprises biometric data.

10. The method of claim 1, wherein the social network data comprises at least one of textual data, photographic data, or video data, and wherein the social network data may be searched based on the local context data.

11. The method of claim 9, wherein the biometric data is at least one of extracted from the social network data or is obtained separately from the social network data.

12. The method of claim 9, wherein at least one of the image-capturing device or the external system analyzes at least one of the biometric data or the social network data with respect to the first context data in order to identify the object of focus.

13. The method of claim 1, further comprising:
determining at least one of a location of the image-capturing device or a time of day associated with receiving the focus instruction;
determining at least one of whether an object has previously been present in a vicinity of the image-capturing device at or around the same time of day or whether the object has previously been captured by the image-capturing device at or around the same location of the image-capturing device; and
in response to determining the object has previously been present in the vicinity of the image-capturing device at or around the same time of day or the object has previously been captured by the image-capturing device at or around the same location of the image-capturing device, determining that the object is the object of focus.

14. The method of claim 1, wherein the second context data is stored in the image-capturing device, and wherein the second context data further comprises data regarding other objects in an image-frame.

15. The method of claim 1, wherein the external system comprises an external datastore, and wherein the first context data is a query to search data associated with the external datastore.

16. The method of claim 1, further comprising modifying, based at least partially on accessing at least one of the first context data or the second context data, the focus distance when the object of focus moves from a first position to a second position.

17. The method of claim 1, further comprising modifying, based at least partially on accessing at least one of the first context data or the second context data, the focus distance based on a facial movement associated with the object of focus.

18. The method of claim 1, wherein the image-capturing device is part of a portable mobile communication device.

19. An image-capturing device comprising:
a memory;
a processor;
a module, stored in the memory and executable by the processor, configured to:
receive a focus instruction, wherein the focus instruction describes an object of focus;
send first context data to an external system, wherein the first context data comprises a location of the image-capturing device;
in response to sending first context data to the external system, receive second context data from the external system, wherein the second context data comprises social network data associated with the object of focus;
identify the object of focus based on the received second context data; and
determine a focus distance based on the identified object.

20. A computer program product for controlling a focus operation for an image-capturing device, the computer program product comprising:
a non-transitory computer readable medium comprising code configured to:
receive a focus instruction, wherein the focus instruction describes an object of focus;
send first context data to an external system, wherein the first context data comprises a location of the image-capturing device;
in response to sending first context data to the external system, receive second context data from the external system, wherein the second context data comprises social network data associated with the object of focus;
identify the object of focus based on the received second context data; and
determine a focus distance based on the identified object.

* * * * *